United States Patent
Higuchi

(10) Patent No.: US 11,670,802 B2
(45) Date of Patent: Jun. 6, 2023

(54) METHOD OF MANUFACTURING SECONDARY BATTERY INCLUDING RELEASING GAS GENERATED DURING INITIAL CHARGING FROM OPENING OF OUTER PACKAGE

(71) Applicant: Murata Manufacturing Co., Ltd., Nagaokakyo (JP)

(72) Inventor: Masashi Higuchi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 135 days.

(21) Appl. No.: 16/750,290

(22) Filed: Jan. 23, 2020

(65) Prior Publication Data
US 2020/0161698 A1  May 21, 2020

Related U.S. Application Data

(63) Continuation of application No. PCT/JP2018/030661, filed on Aug. 20, 2018.

(30) Foreign Application Priority Data

Aug. 31, 2017  (JP) .............................. JP2017-166827

(51) Int. Cl.
*H01M 10/058* (2010.01)
*H01M 4/13* (2010.01)
(Continued)

(52) U.S. Cl.
CPC ........... *H01M 10/058* (2013.01); *H01M 4/13* (2013.01); *H01M 10/0525* (2013.01);
(Continued)

(58) Field of Classification Search
CPC .................. H01M 10/058; H01M 10/0525
(Continued)

(56) References Cited

U.S. PATENT DOCUMENTS

| 6,485,862 B1 | 11/2002 | Yoshioka et al. |
| 9,741,974 B2 | 8/2017 | Kwon et al. |

(Continued)

FOREIGN PATENT DOCUMENTS

| CN | 107403945 A | * 11/2017 | ........ H01M 10/0481 |
| JP | 2001273884 A | 10/2001 | |

(Continued)

OTHER PUBLICATIONS

International Search Report issued for PCT/JP2018/030661, dated Nov. 20, 2018.

(Continued)

*Primary Examiner* — Sean P Cullen
(74) *Attorney, Agent, or Firm* — ArentFox Schiff LLP

(57) ABSTRACT

A method of manufacturing a secondary battery that includes providing a secondary battery precursor having an electrode assembly with a cutout portion in a plan view thereof and an electrolyte accommodated in an outer package, the electrode assembly including a positive electrode, a negative electrode, and a separator disposed between the positive electrode and the negative electrode; erecting the secondary battery precursor so as to have an opening of the outer package arranged uppermost in a vertical direction in an erected state; and initially charging the secondary battery precursor such that gas generated in the secondary battery precursor is released from the opening of the outer package.

10 Claims, 13 Drawing Sheets

(51) Int. Cl.
  *H01M 10/0525* (2010.01)
  *H01M 10/44* (2006.01)
  *H01M 50/636* (2021.01)
  *H01M 50/105* (2021.01)
  *H01M 50/618* (2021.01)

(52) U.S. Cl.
  CPC ......... *H01M 10/44* (2013.01); *H01M 50/105* (2021.01); *H01M 50/636* (2021.01); *H01M 50/618* (2021.01)

(58) Field of Classification Search
  USPC ........................................ 429/213; 29/623.2
  See application file for complete search history.

(56) References Cited

U.S. PATENT DOCUMENTS

| | | | |
|---|---|---|---|
| 9,905,891 | B2 | 2/2018 | Ryu et al. |
| 2012/0251858 | A1* | 10/2012 | Kato ................... H01M 50/534 361/518 |
| 2015/0089798 | A1* | 4/2015 | Tamura ............... H01M 10/446 29/623.1 |
| 2015/0372353 | A1 | 12/2015 | Ryu et al. |
| 2016/0020434 | A1 | 1/2016 | Kwon et al. |

FOREIGN PATENT DOCUMENTS

| | | | | |
|---|---|---|---|---|
| JP | 2007289698 | A | | 11/2007 |
| JP | 2013140825 | A | | 7/2013 |
| JP | 2014026833 | A | * | 2/2014 |
| JP | 2015164176 | A | | 9/2015 |
| JP | 2016009677 | A | | 1/2016 |
| JP | 2016505204 | A | | 2/2016 |
| JP | 2016506606 | A | | 3/2016 |
| JP | 2017084508 | A | * | 5/2017 |
| KR | 101748362 | B1 | * | 6/2017 |
| WO | 2000041263 | A1 | | 7/2000 |

OTHER PUBLICATIONS

Written Opinion of the International Searching Authority issued for PCT/JP2018/030661, dated Nov. 20, 2018.

\* cited by examiner

METHOD OF MANUFACTURING SECONDARY BATTERY INCLUDING RELEASING GAS GENERATED DURING INITIAL CHARGING FROM OPENING OF OUTER PACKAGE

CROSS REFERENCE TO RELATED APPLICATIONS

The present application is a continuation of International application No. PCT/JP2018/030661, filed Aug. 20, 2018, which claims priority to Japanese Patent Application No. 2017-166827, filed Aug. 31, 2017, the entire contents of each of which are incorporated herein by reference.

FIELD OF THE INVENTION

The present invention relates to a secondary battery and a method of manufacturing the same.

BACKGROUND OF THE INVENTION

Conventionally, a secondary battery has been used as a power source of various electronic devices. A secondary battery has a structure in which an electrode assembly including a positive electrode, a negative electrode, and a separator disposed between the positive electrode and the negative electrode, and an electrolyte are encapsulated in an outer package. In particular, in a lithium ion secondary battery, the battery is charged and discharged by causing lithium ions to move between the positive electrode and the negative electrode through the electrolyte.

When a secondary battery is manufactured, generally, an electrode assembly is accommodated in an outer package, an electrolyte is injected into the outer package, the inside of the outer package is sealed, whereby a secondary battery precursor is obtained, and then initial charging is performed. As a known method, a solid electrolyte interface coating (hereinafter referred to as "SEI coating") is formed on the negative electrode surface by initial charging to extend battery life.

However, in the initial charging step, gas is generated from decomposition of electrolyte components, and the gas adheres to the negative electrode surface in the form of air bubbles. These air bubbles cause charging unevenness, which inhibits formation of the SEI coating in some parts, and makes the thickness of the SEI coating uneven. When the thickness of the SEI coating is uneven, charging and discharging during use as a secondary battery may cause precipitation of lithium around areas where the SEI coating is thin, and cause safety problems. There has also been a problem that the reduction in the reactive area and consumption of lithium ions due to the lithium precipitation reduce the battery capacity.

Meanwhile, a technique of Patent Document 1 has been known in which a unique structure of a secondary battery is adopted to reduce the influence of gas generated during use of the secondary battery (that is, during repeated charging and discharging). Specifically, Patent Document 1 discloses a secondary battery 510 obtained by accommodating, in an outer package made of a film laminate, a rectangular battery element in which one or more positive electrodes and negative electrodes are wound or laminated with a separator interposed therebetween, injecting a non-aqueous electrolyte, and then heat-sealing the outer package. More specifically, Patent Document 1 discloses, as a structure of a secondary battery as a final product, the secondary battery 510 provided with a space serving as a gas pocket 502 adjacent to a space 501 that accommodates a battery element, as shown in FIG. 8. In the secondary battery 510, an easily peelable portion 504 having a peel strength lower than that of its periphery exists in a part of a heat seal portion 503 between both spaces. In such a secondary battery, gas generated by charging and discharging for 500 cycles or more moves to the gas pocket, so that long-term cycle stability is improved.

Patent Document 1: Japanese Patent Application Laid-Open No. 2016-9677

Patent Document 2: Published Japanese Translation of PCT International Application No. 2016-506606

SUMMARY OF THE INVENTION

The inventors of the present invention tested a technique for preventing charging unevenness due to air bubbles, by adopting a unique structure of a secondary battery precursor in the method of manufacturing a secondary battery and thereby collecting gas generated in an initial charging step. First, as shown in FIG. 9A, an electrode assembly 601 rectangular in shape in a plan view thereof and including a positive electrode, a negative electrode, and a separator disposed between the positive electrode and the negative electrode is accommodated in an outer package 603 having a larger dimension than the aforementioned rectangular shape, and an electrolyte is injected into the outer package. Next, as shown in FIG. 9B, a secondary battery precursor 610 obtained by sealing an opening of the outer package to form a seal portion 604 is subjected to initial charging. Specifically, the secondary battery precursor 610 has a gas pocket 602 that is in contact with an entire side of the rectangular shape of the electrode assembly 601. In the initial charging step, the secondary battery precursor 610 is disposed such that the gas pocket 602 is positioned above an accommodating portion of the electrode assembly 601 in the vertical direction as shown in FIG. 9B. As a result, the gas generated in the initial charging step is collected in the gas pocket 602, and charging unevenness due to air bubbles is prevented. Thereafter, as shown in FIG. 9C, after sealing a boundary between the accommodating portion of the electrode assembly 601 and the gas pocket 602 in the secondary battery precursor to form a seal portion 605, the gas pocket 602 is separated and a secondary battery precursor 600 can be obtained.

Then, the inventors of the present invention have found that a new problem arises that, when a secondary battery having a cutout portion as shown in Patent Document 2 is manufactured using the above-described technique related to the structure of the secondary battery precursor, charging unevenness due to air bubbles cannot be prevented locally. Specifically, first, as shown in FIG. 10A, an electrode assembly 701 having a cutout portion in plan view is accommodated in a rectangular outer package 703 having a larger dimension than the electrode assembly. The electrode assembly 701 includes a positive electrode, a negative electrode, and a separator disposed between the positive electrode and the negative electrode.

Next, as shown in FIG. 10B, a seal portion 704a is formed in the outer package 703 according to the shape of the electrode assembly 701, and a part corresponding to the cutout portion in the secondary battery is cut. Alternatively, a seal portion 704a may be formed as in FIG. 10B on an outer package that has been cut in advance so as to correspond to the shape of the electrode assembly 701.

Thereafter, an electrolyte is injected into the outer package, and as shown in FIG. 10C, a seal portion 704b is formed by sealing an opening of the outer package to obtain a secondary battery precursor 710, and the secondary battery precursor 710 is subjected to initial charging. Specifically, the secondary battery precursor 710 usually has a gas pocket 702 in an upper end portion of a highest portion 701a of the electrode assembly 701 in the secondary battery precursor 710. "Height" refers to the height of the electrode assembly 701 in the secondary battery precursor when used in the initial charging step. Since the electrode assembly 701 has a cutout portion, the electrode assembly 701 includes two or more constituent parts having different heights, that is, has a highest portion 701a and a not-highest portion 701b. In the initial charging step, the secondary battery precursor 710 is disposed such that the gas pocket 702 is positioned above the highest portion 701a of the electrode assembly 701 as shown in FIG. 10C.

After the initial charging step, as shown in FIG. 10D, after sealing a boundary between the accommodating portion of the electrode assembly 701 and the gas pocket 602 in the secondary battery precursor to form a seal portion 705, the gas pocket 702 is separated and a secondary battery 700 is obtained.

When a secondary battery having a cutout portion is manufactured by such a technique, the gas generated in the highest portion 701a of the electrode assembly 701 in the initial charging step is collected in the gas pocket 702 as shown in FIG. 10C, and charging unevenness due to air bubbles is prevented. However, since gas generated in the not-highest portion 701b causes a gas pool in an upper portion 720 of the not-highest portion 701b as shown in FIG. 10C, charging unevenness due to air bubbles cannot be prevented sufficiently in the not-highest portion 701b.

An object of the present invention is to provide a method of manufacturing a secondary battery that can more sufficiently prevent charging unevenness due to air bubbles in an entire secondary battery, even when the secondary battery has a cutout portion.

The present invention relates to a method of manufacturing a secondary battery that includes providing a secondary battery precursor having an electrode assembly with a cutout portion in a plan view thereof and an electrolyte accommodated in an outer package, the electrode assembly including a positive electrode, a negative electrode, and a separator disposed between the positive electrode and the negative electrode; erecting the secondary battery precursor so as to have an opening of the outer package arranged uppermost in a vertical direction in an erected state; and initially charging the secondary battery precursor such that gas generated in the secondary battery precursor is released from the opening of the outer package.

According to the method of manufacturing a secondary battery of the present invention, even when a secondary battery and an electrode assembly included in the secondary battery have a cutout portion, initial charging can be performed while charging unevenness due to air bubbles is more sufficiently prevented in an entire secondary battery precursor. For this reason, in the initial charging step, charging unevenness due to air bubbles is more sufficiently prevented over the entire negative electrode surface, so that the SEI coating is formed with a more uniform thickness. As a result, battery life can be extended by charging and discharging, and the interface resistance of the negative electrode and the electrolytic solution is uniform, so that an internal short circuit due to irreversible lithium dendrite generation can be prevented and safety can be improved.

Further, since irreversible lithium is not generated, lithium involved in charging and discharging is not reduced, and a decrease in initial battery capacity is prevented.

DETAILED DESCRIPTION OF THE INVENTION

[Method of Manufacturing Secondary Battery]

Figure 1A:
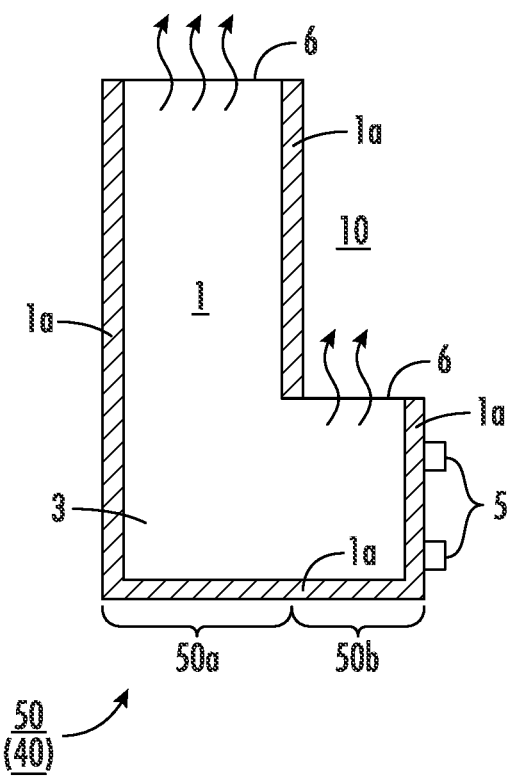
FIG. 1A is a schematic plan view of an example of a secondary battery precursor used in a method of manufacturing a secondary battery according to a first embodiment of the present invention, and also corresponds to a schematic front view of the secondary battery precursor in an initial charging step.
Figure 1B:
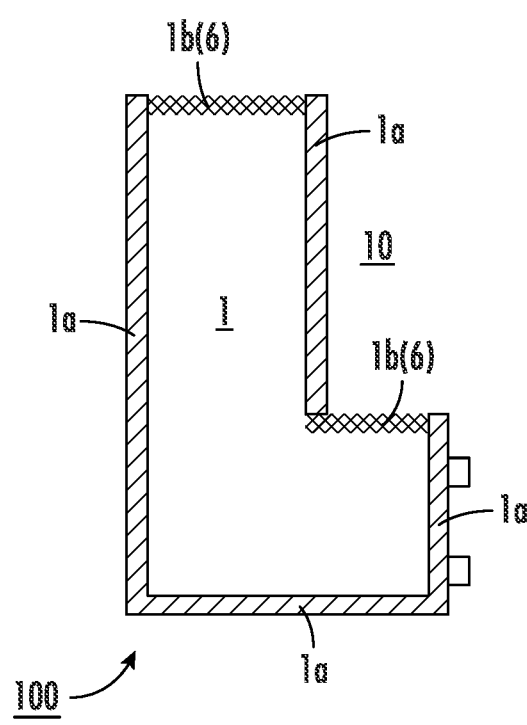
FIG. 1B is a schematic plan view of a secondary battery obtained by using the secondary battery precursor of FIG. 1A, and also corresponds to a schematic plan view of the secondary battery for describing a sealing step after the initial charging step.
Figure 2A:
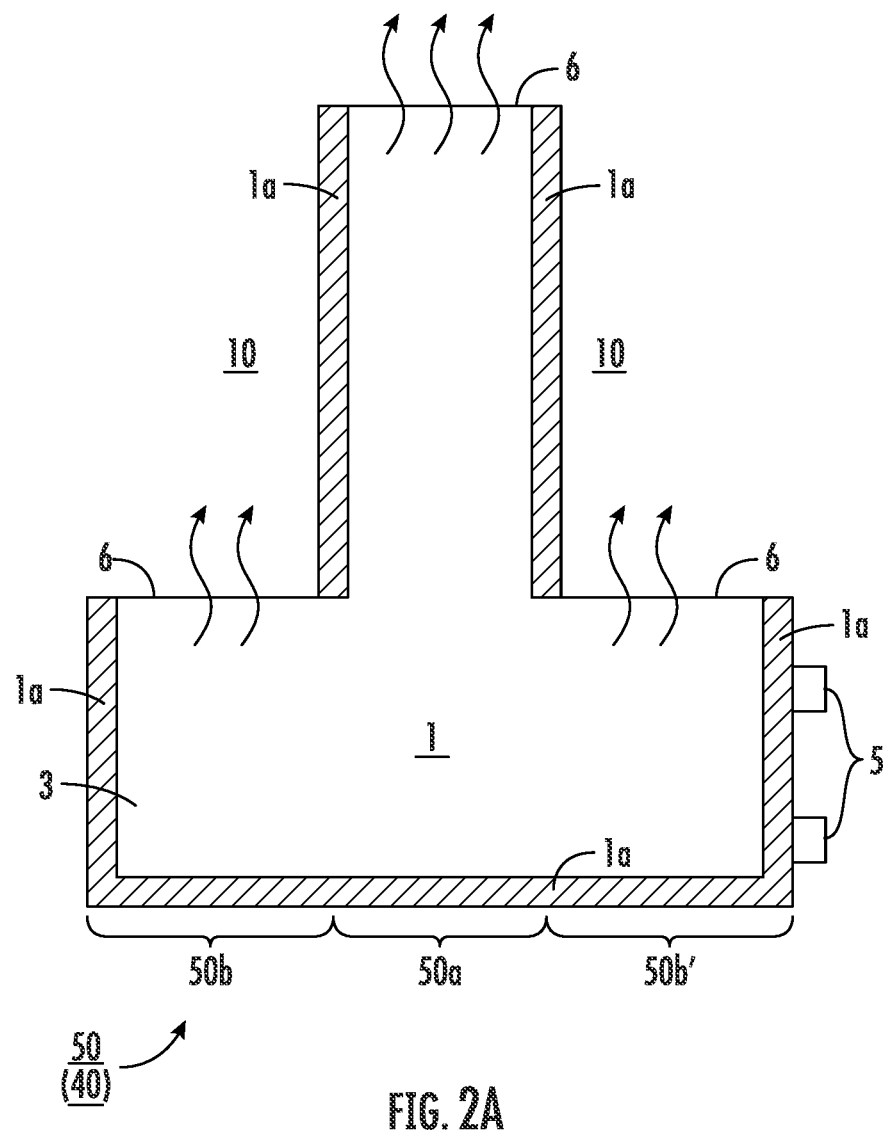
FIG. 2A is a schematic plan view of an example of a secondary battery precursor used in the method of manufacturing a secondary battery according to the first embodiment of the present invention, and also corresponds to a schematic front view of the secondary battery precursor in an initial charging step.
Figure 2B:
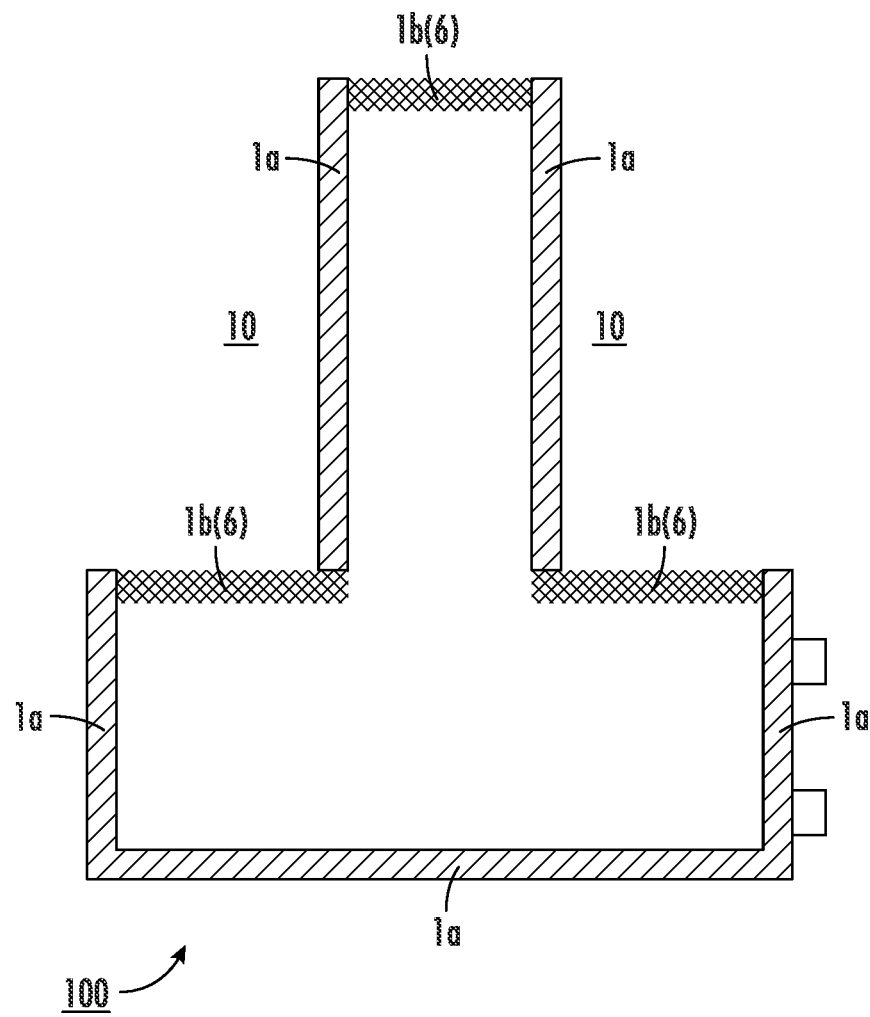
FIG. 2B is a schematic plan view of a secondary battery obtained by using the secondary battery precursor of FIG. 2A, and also corresponds to a schematic plan view of the secondary battery for describing a sealing step after the initial charging step.
Figure 3A:
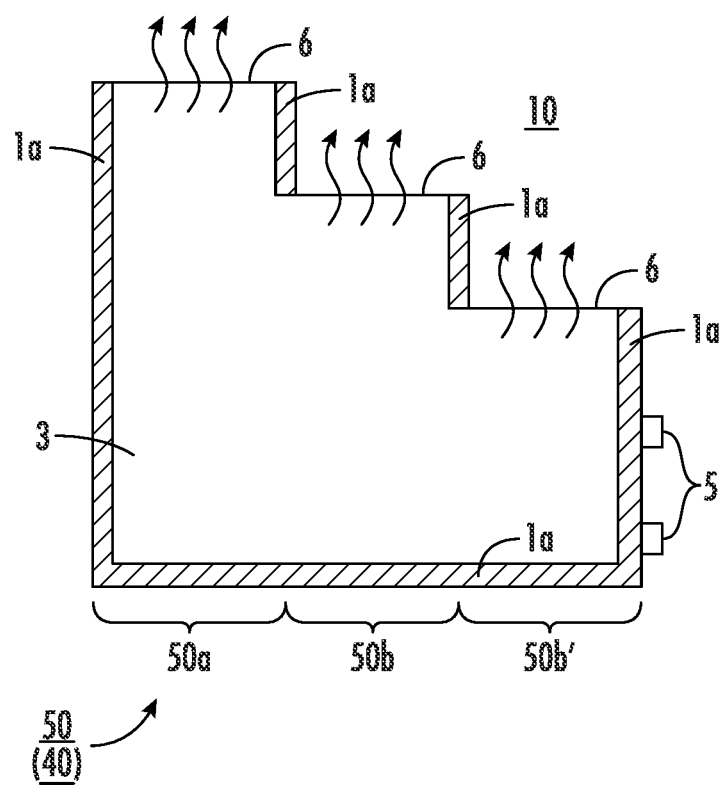
FIG. 3A is a schematic plan view of an example of a secondary battery precursor used in the method of manufacturing a secondary battery according to the first embodiment of the present invention, and also corresponds to a schematic front view of the secondary battery precursor in an initial charging step.
Figure 3B:
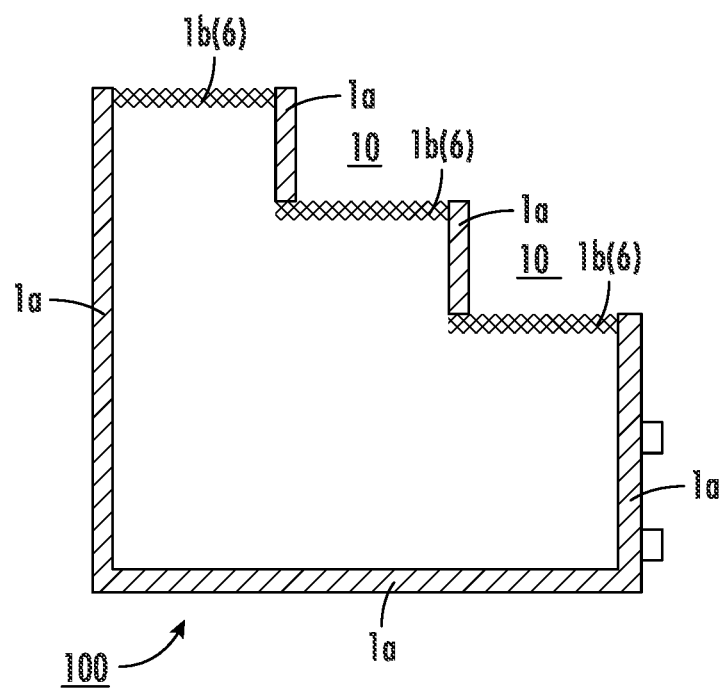
FIG. 3B is a schematic plan view of a secondary battery obtained by using the secondary battery precursor of FIG. 3A, and also corresponds to a schematic plan view of the secondary battery for describing a sealing step after the initial charging step.
Figure 4A:
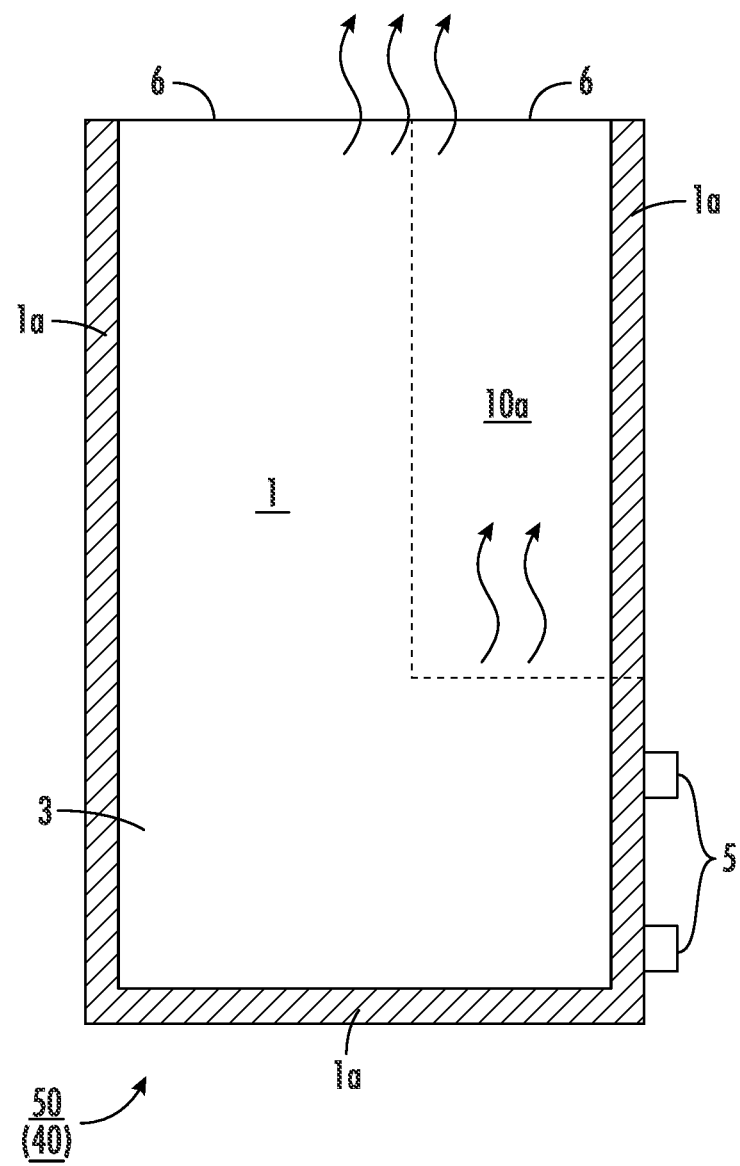
FIG. 4A is a schematic plan view of an example of a secondary battery precursor used in a method of manufacturing a secondary battery according to a second embodiment of the present invention, and also corresponds to a schematic front view of the secondary battery precursor in an initial charging step.
Figure 4B:
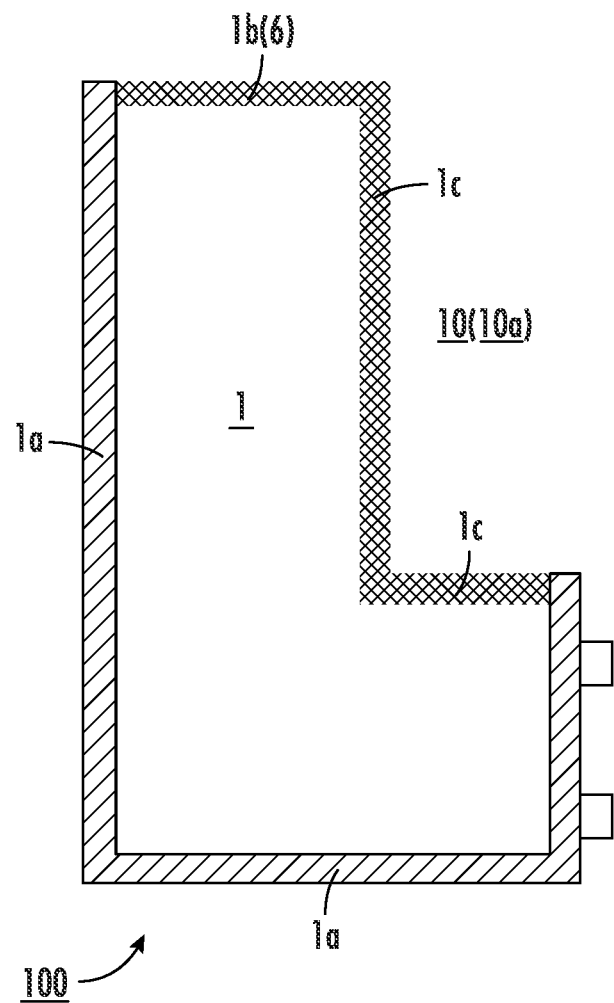
FIG. 4B is a schematic plan view of a secondary battery obtained by using the secondary battery precursor of FIG. 4A, and also corresponds to a schematic plan view of the secondary battery for describing a sealing step after the initial charging step.
Figure 5A:
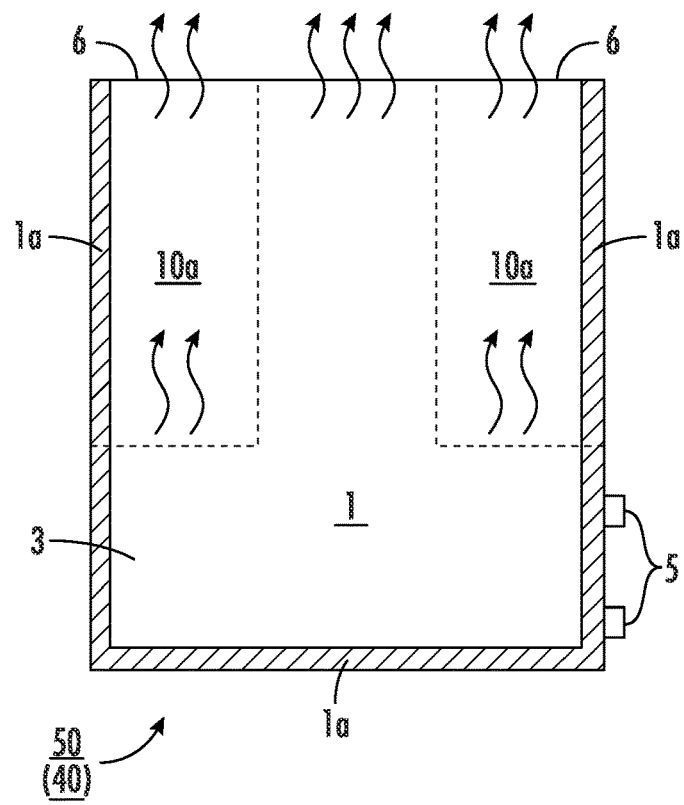
FIG. 5A is a schematic plan view of an example of a secondary battery precursor used in the method of manufacturing a secondary battery according to the second embodiment of the present invention, and also corresponds to a schematic front view of the secondary battery precursor in an initial charging step.
Figure 5B:
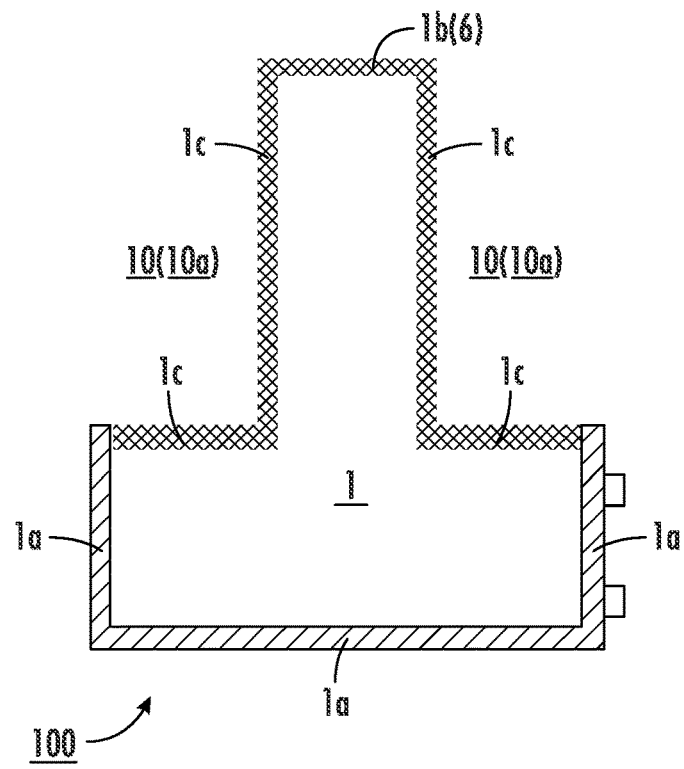
FIG. 5B is a schematic plan view of a secondary battery obtained by using the secondary battery precursor of FIG. 5A, and also corresponds to a schematic plan view of the secondary battery for describing a sealing step after the initial charging step.
Figure 6A:
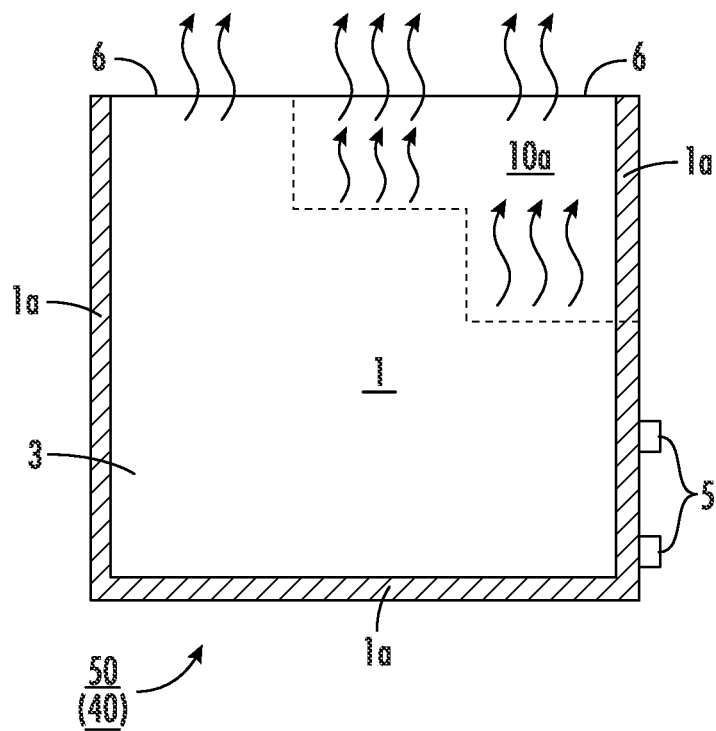
FIG. 6A is a schematic plan view of an example of a secondary battery precursor used in the method of manufacturing a secondary battery according to the second embodiment of the present invention, and also corresponds to a schematic front view of the secondary battery precursor in an initial charging step.
Figure 6B:
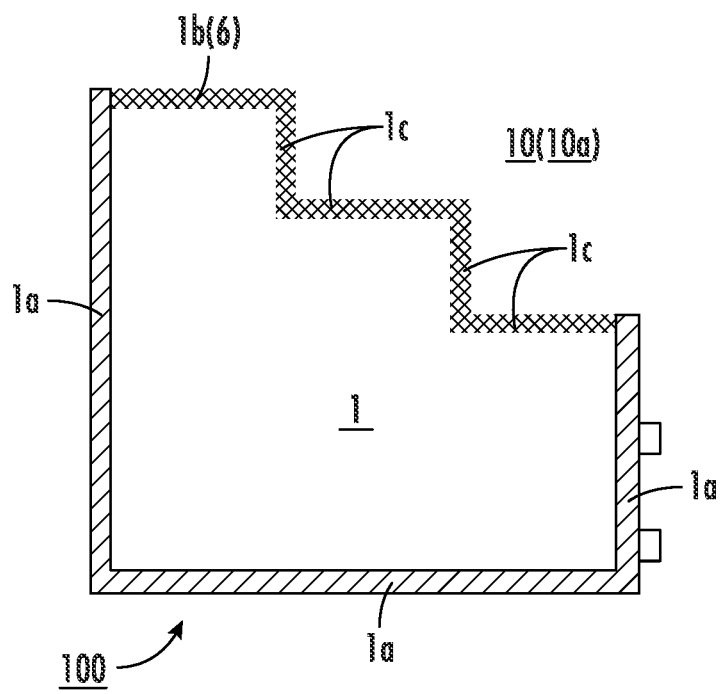
FIG. 6B is a schematic plan view of a secondary battery obtained by using the secondary battery precursor of FIG. 6A, and also corresponds to a schematic plan view of the secondary battery for describing a sealing step after the initial charging step.

The present invention provides a method of manufacturing a secondary battery. In the specification, the term "secondary battery" refers to a battery that can be repeatedly charged and discharged. Accordingly, a "secondary battery" is not excessively bound by the name, and may include an "electric storage device", for example. A "secondary battery precursor" to be described later is an intermediary body or intermediary structure of a secondary battery obtained by accommodating an electrode assembly and an electrolyte in an outer package before an initial charging step. An "electrode assembly" is an electrode structure including a positive electrode, a negative electrode, and a separator.

In the present invention, as will be described in detail later, initial charging is performed while gas generated in an electrode assembly in a secondary battery precursor is released from an opening. That is, an initial charging step is performed while directly releasing a gas generated in the secondary battery precursor from the opening to the ambient atmosphere, without temporarily collecting the gas in a so-called gas pocket. For this reason, gas generated in the present invention can be easily and quickly discharged from the secondary battery precursor without undergoing much fluid loss. As a result, charging unevenness due to air bubbles can be more sufficiently prevented in the entire secondary battery precursor.

Hereinafter, a secondary battery precursor used for a method of manufacturing a secondary battery of the present invention and steps included in the method are described in detail by use of drawings illustrating some embodiments. In the specification, various elements in the drawings are merely schematically and exemplarily shown for understanding of the present invention, and the appearance and size ratio may be different from the actual ones. Unless otherwise specified, the "vertical direction", "horizontal direction", and "front-back direction" used directly or indirectly in the specification are directions corresponding to the vertical direction, the horizontal direction, and the front-back direction in the drawings. Unless otherwise specified, the same reference symbol or symbol indicates the same member or the same meaning except that the shape is different.

(Secondary Battery Precursor)

In a secondary battery precursor used in the present invention, an electrode assembly 1 and an electrolyte (not shown) are accommodated in an outer package 3. The term "accommodated" means that the electrode assembly and the electrolyte are inserted into the outer package in an open atmosphere, which is different from "encapsulated" indicating a sealed state.

The electrode assembly 1 includes a positive electrode, a negative electrode, and a separator, and the positive electrode and the negative electrode are alternately arranged with the separator interposed therebetween. Two external terminals 5 of the electrode assembly 1 are usually connected to electrodes (positive electrode or negative electrode) through current collecting leads, and as a result, are led out from the outer package. The electrode assembly 1 may have a flat laminated structure in which multiple electrode units (electrode constituent layers) including a positive electrode, a negative electrode, and a separator disposed between the positive electrode and the negative electrode are laminated in a flat shape. The structure of the electrode assembly is not limited to the flat laminated structure, and may have a jelly roll type (also referred to as "winding structure") in which an electrode units (electrode constituent layers) including a positive electrode, a negative electrode, and a separator disposed between the positive electrode and the negative electrode are wound in a roll shape, for example. Alternatively, the electrode assembly may have a so-called stack and folding structure in which a positive electrode, a separator, and a negative electrode are stacked on a long film and folded, for example. From the viewpoint of more sufficiently preventing charging unevenness due to air bubbles in an entire secondary battery precursor in an initial charging step, it is preferable that the electrode assembly 1 have a flat laminated structure.

The electrode assembly 1 has a cutout portion 10 in plan view. "Plan view" is a state when an object (e.g., electrode assembly, secondary battery precursor, or secondary battery) is placed and viewed from directly above in its thickness (height) direction, and is synonymous with "plan view." The cutout portion 10 is a portion that can be recognized from the electrode assembly and the secondary battery, and is a part where a portion of an initial shape of the electrode assembly 1 in plan view (hereinafter simply referred to as "initial shape of the electrode assembly 1") is finally removed from the initial shape of the electrode assembly 1. The cutout portion 10 is a portion remaining after taking out an irregular shape of the electrode assembly from the initial shape before forming the cutout portion. The initial shape before forming the cutout portion is usually the smallest rectangular shape including the irregular shape of the electrode assembly. A rectangular shape usually includes a rectangle and a square. While the plan view shape of the cutout portion is rectangular (particularly oblong-shaped) in FIGS. 1A to 6A, the plan view shape is not particularly limited, and may be rectangular (square-shaped), triangular, fan-shaped, semicircular, or circular, for example. FIGS. 1A to 6A are schematic plan views of an example of a secondary battery precursor 50 used in the method of manufacturing a secondary battery of the present invention, and are also schematic front views of the secondary battery precursor in an initial charging step described later. FIGS. 1A to 6A include "FIGS. 1A, 2A, 3A, . . . , and 6A." For example, "FIGS. 1A to 3A" include FIGS. 1A, 2A, and 3A.

Since the electrode assembly 1 has the cutout portion 10 in plan view, the overall shape (irregular shape) of the electrode assembly 1 is reflected, and the secondary battery 100 as the final product also has the cutout portion 10 in plan view, as shown in FIGS. 1B to 6B. For example, in both the electrode assembly 1 and the secondary battery 100, the cutout portion 10 is literally a cutout portion, and thus is a portion where nothing exists. FIGS. 1B to 6B include "FIGS. 1B, 2B, 3B, . . . , and 6B." FIGS. 1B to 6B are schematic plan views of a secondary battery 100 obtained by using the secondary battery precursor of FIGS. 1A to 6A, respectively, and also correspond to schematic plan views of the secondary battery for describing a sealing step after an initial charging step described later.

In the present invention, the secondary battery precursor 50 includes a first embodiment and a second embodiment on the basis of the shape of the outer package 3 forming the secondary battery precursor. From the viewpoint of further prevention of charging unevenness in the initial charging step, the secondary battery precursor according to the first embodiment is preferable. The discharge distance until the gas generated in the electrode assembly 1 reaches the opening 6 in the first embodiment is relatively shorter than the distance in the second embodiment. For this reason, the fluid loss that the gas discharged into the ambient atmosphere undergoes in the first embodiment is less than the fluid loss in the second embodiment. Furthermore, the stability of the electrode assembly 1 in the outer package 3 in the initial charging step in the first embodiment is higher than the stability in the second embodiment. As a result, in the first embodiment, gas is more easily discharged and charging unevenness is prevented to a greater extent.

In the present invention, the secondary battery precursor 50 of the first embodiment is also preferable from the viewpoint of preventing admixture of foreign matter. Since mixing of foreign matter into a secondary battery causes an abnormal heat generation accident such as ignition, the secondary battery is manufactured in an extremely clean environment in a clean and dry room. However, in reality, the amount of foreign matter in a clean and dry room can be brought close to 0, but it cannot be completely eliminated. As will be described later, in the secondary battery precursor 50 of the first embodiment, multiple openings are provided over the entire length of a side (all sides) perpendicular to the vertical direction in an initial charging step described later, among the sides forming the outer edge of the secondary battery precursor in plan view (front view in initial charging step). On the other hand, in the secondary battery precursor of the second embodiment, one opening is provided over the entire length of a side (all sides) perpendicular to the vertical direction in an initial charging step described later, among the sides forming the outer edge of the secondary battery precursor in plan view. Accordingly, if the entire lengths are equivalent, the opening area (total) in the secondary battery precursor of the first embodiment having multiple openings with relatively small diameters is smaller than the opening area of the secondary battery precursor of the second embodiment having only one opening with a relatively large diameter. For this reason, the secondary battery precursor of the first embodiment is preferable because it is less likely to be contaminated with foreign matter than the secondary battery precursor of the second embodiment. "Front view" in an initial charging step is a state when the secondary battery precursor is erected and viewed from the front in the initial charging step, and is a view from the front (particularly the front view of the secondary battery precursor in the thickness direction). In the specification, a front view in the initial charging step often corresponds to a plan view when an object is placed and viewed from directly above in its the thickness (height) direction.

(1) First Embodiment

In plan view, the outer package 3 of the secondary battery precursor 50 according to the first embodiment has a shape corresponding to the plan view shape of the electrode assembly 1 as shown in FIGS. 1A to 3A, for example. That is, the outer package 3 of the secondary battery precursor according to the first embodiment has substantially the same plan view shape as that of the electrode assembly 1 except that it has a seal portion on its outer edge as shown in FIGS. 1A to 3A, for example. Further, in plan view, the outer package 3 of the secondary battery precursor according to the first embodiment has substantially the same dimensions as that of the electrode assembly 1 except that it has a seal portion on its outer edge. In the secondary battery precursor according to the embodiment, since the outer package 3 has a shape corresponding to the plan view shape of the electrode assembly 1, the cutout portion 10 is a portion where nothing exists.

The secondary battery precursor 50 according to the embodiment has a shape corresponding to the plan view shape of the electrode assembly 1, and therefore includes two or more constituent parts having different heights in plan view (front view in initial charging step). For example, as shown in FIGS. 1A to 3A, the secondary battery precursor 50 includes at least one highest portion 50*a* that provides the maximum height and at least one not-highest portion (50*b*, 50*b*') having a lower height than the highest portion 50*a*. "Have different heights" means that the height is different between adjacent constituent parts. "The secondary battery precursor includes two or more constituent parts having different heights in plan view" specifically has the following meaning: from among the sides forming the outer edge of the secondary battery precursor in plan view, when the secondary battery precursor is erected with one linear side that forms (defines) one side of all the constituent parts in common as the base, there are two or more constituent parts having different heights.

The secondary battery precursor 50 according to the embodiment has one opening 6 in each constituent part, and more specifically, has one opening at the top in the height direction in each constituent part. For this reason, in the secondary battery precursor, multiple openings are provided over the entire length of a side (all sides) perpendicular to the vertical direction of the initial charging step described later, among the sides forming the outer edge of the secondary battery precursor in plan view. As a result, the secondary battery precursor of the embodiment can be erected so as to have an opening at the top in the vertical direction in the initial charging step described later.

(2) Second Embodiment

An outer package 3 of a secondary battery precursor according to a second embodiment is rectangular in plan view as shown in FIGS. 4A to 6A, for example, and has substantially the same dimensions as the dimensions of the rectangular initial shape of the electrode assembly 1 before forming the cutout portion. That is, in plan view, in the outer package 3 of the secondary battery precursor according to the second embodiment, as shown in FIGS. 4A to 6A, the dimensions in both the width direction and the vertical direction are substantially the same as the initial shape of an electrode assembly 1 when the width of a seal portion formed on its outer edge thereof is not considered. In the secondary battery precursor according to the embodiment, the outer package 3 is rectangular even though the electrode assembly 1 has an irregular shape. Hence, a part 10a corresponding to a cutout portion 10 of the electrode assembly 1 in a secondary battery precursor 50 may be formed of two films included in the outer package 3. In the secondary battery precursor 50 of the embodiment, the two films forming the part 10a corresponding to the cutout portion 10 of the electrode assembly 1 may be separable from each other with or without an electrolyte interposed therebetween. "Separable from each other" refers to a state in which the two films have such flexibility that they can be brought into contact with each other and be separated from each other.

Since the secondary battery precursor according to the embodiment is rectangular, it does not have two or more constituent parts having different heights in plan view. That is, the secondary battery precursor has a substantially uniform height as shown in FIGS. 4A to 6A.

The secondary battery precursor according to the embodiment has one opening, and more specifically, has one opening over the entire length of one side of the rectangular shape of the secondary battery precursor in plan view. For this reason, in the secondary battery precursor, one opening is provided over the entire length of a side (all sides) perpendicular to the vertical direction of the initial charging step described later, among the sides forming the outer edge of the secondary battery precursor in plan view. As a result, the secondary battery precursor of the embodiment can be erected so as to have an opening at the top in the vertical direction in the initial charging step described later.

(3) Common to First Embodiment and Second Embodiment

The secondary battery precursor according to the first embodiment and the second embodiment can be manufactured by an accommodating step of accommodating the electrode assembly in the outer package, and sealing the outer edge region of the outer package except for an opening; and an injection step of injecting an electrolyte through the opening into the outer package accommodating the electrode assembly.

Step of Accommodating Electrode Assembly in Outer Package

In an accommodating step, as shown in FIGS. 1A to 6A, for example, the electrode assembly 1 is accommodated in the outer package 3, and the outer edge region of the outer package 3 is sealed except for the opening 6. The seal portion formed by the seal in this step does not contain an electrolyte component, and such a seal portion that does not contain an electrolyte component is referred to as a "first seal portion" and denoted by reference symbol "1a" in the drawings. The first seal portion 1a is different from "second seal portion 1b" and "third seal portion 1c", which will be described later, containing an electrolyte component. Note that while FIGS. 1A to 6A are schematic plan views of an example of a secondary battery precursor used in the method of manufacturing a secondary battery of the present invention as described above, if it is assumed that no electrolyte is included, FIGS. 1A to 6A also correspond to schematic plan views of a structure (outer package including electrode assembly) 40 obtained in the accommodating step.

While the outer package 3 is formed of two separate films in FIGS. 1A to 6A, the two films may be continuous. When the two films forming the outer package 3 are continuous and the film is folded to form the outer package, the first seal portion 1a in one outer peripheral region of the outer package where the film is folded may be omitted. The external terminal 5 may be led out from any first seal portion 1a.

The sealing method in the accommodating step is not particularly limited as long as the electrolyte does not leak from the formed seal portion. For example, when the outer package is a flexible pouch described later, the outer package may be sealing by a heat sealing method. For example, when the outer package is a hard case described later, the outer package may be sealed by a laser welding method.

Step of Injecting Electrolyte into Outer Package

In an injection step, as shown in FIGS. 1A to 6A, for example, an electrolyte can be injected through the opening 6 into the outer package 3 accommodating the electrode assembly 1, to obtain a secondary battery precursor.

The injection method is not particularly limited as long as the electrolyte is injected into the outer package and the electrode assembly is impregnated with the electrolyte. Examples include a method of guiding the electrolyte into the outer package using one or more nozzles and the like.

The electrode assembly may be impregnated with the electrolyte by reducing pressure and then returning to normal pressure.

Reduced pressure is usually set in a range of "atmospheric pressure −90 kPa" or more and "atmospheric pressure −1 kPa" or less, and equal to or below the vapor pressure curve of the electrolyte so that the electrolyte does not boil.

The secondary battery precursor 50 may have a stepped portion in side view. "Stepped portion" refers to a discontinuous portion of an upper surface that is formed of two upper surfaces having different heights in side view, the height locally changing between the two upper surfaces. Unless otherwise specified, "side view" is a state when an object (e.g., secondary battery precursor) is placed and viewed from the direct side in its thickness (height) direction, and is synonymous with "lateral view."

(Initial Charging Step)

In the method of manufacturing a secondary battery of the present invention, first, an initial charging step is performed using the secondary battery precursor described above.

The initial charging step is an initial charging step of the secondary battery precursor performed to form an SEI coating on the negative electrode surface, and is referred to as an initial charging step, a conditioning step, or a formation step. The SEI coating is formed by reducing and decomposing a part of the electrolyte and the additive contained in the electrolyte on the negative electrode surface in this step, and prevents further decomposition of the additive on the negative electrode surface during use as a secondary battery. An SEI coating usually includes one or more materials selected from the group consisting of LiF, $Li_2CO_3$, LiOH, and LiOCOOR (R represents a monovalent organic group such as an alkyl group). By forming such an SEI coating uniformly on the negative electrode surface, decomposition of the electrolyte component in the secondary battery can be prevented, the capacity of the secondary battery can be stabilized, and battery life can be extended.

In the present invention, initial charging is performed while gas generated in the electrode assembly in the secondary battery precursor is released from the opening. That is, an initial charging step is performed while directly releasing gas generated in the secondary battery precursor from the opening to the ambient atmosphere, without temporarily collecting the gas in a so-called gas pocket. For this reason, the initial charging step in the present invention can also be referred to as a degassing initial charging step. In the present invention, the generated gas can be easily and quickly discharged from the secondary battery precursor without undergoing much fluid loss. In the specification, "fluid loss" means the resistance received when the generated gas is discharged. In the present invention, it is considered that the fluid loss that the gas undergoes before being discharged from the opening is smaller than the fluid loss that the gas undergoes before being collected in the gas pocket. For example, in the present invention, since the secondary battery precursor has an opening that opens to the ambient atmosphere, the inside of the secondary battery precursor is an open system in which mass transfer is likely to occur. On the other hand, a secondary battery precursor having a gas pocket is usually a vacuum-sealed system in which all outer edges are sealed, and is a closed system in which mass transfer does not occur or hardly occurs. Accordingly, the inside is restrained by atmospheric pressure. Based on such difference in the type of system and difference in restraining force associated with the difference, the magnitude of fluid loss that the gas undergoes is also different, and in the present invention, the gas is more promptly moved and easily and actively discharged to the outside than the gas collected in the gas pocket. As a result, even when the secondary battery and the electrode assembly included in the secondary battery have a cutout portion, gas pools are less likely to occur, and initial charging can be performed while charging unevenness due to air bubbles is more sufficiently prevented in the entire secondary battery precursor.

In this step, as shown in FIGS. 1A to 6A, the secondary battery precursor 50 is subjected to initial charging while being erected so as to have the opening 6 at the top in the vertical direction.

"The secondary battery precursor 50 has the opening 6 at the top in the vertical direction" means that, particularly when using the secondary battery precursor of the first embodiment, the secondary battery precursor has the opening 6 at the top in the vertical direction in each constituent part. "Erect" means to install in a standing state. The secondary battery precursor does not necessarily have to be installed standing in the vertical direction, and may be installed inclined with respect to the horizontal plane. From the viewpoint of further prevention of charging unevenness in the initial charging step, the secondary battery precursor is preferably installed standing in the vertical direction. When the secondary battery precursor does not have the opening at the top but has the opening in the middle in the vertical direction, for example, the electrolyte leaks from the opening.

In this step, the secondary battery precursor 50 is usually erected so that the cutout portion of the electrode assembly 1 is higher than the other portions of the electrode assembly 1. That is, in this step, the secondary battery precursor 50 is erected so that the cutout portion of the electrode assembly 1 does not form the base (bottom) in the erected state.

The initial charging is performed while gas generated in the electrode assembly in the secondary battery precursor is released from the opening. In the secondary battery precursor of the first embodiment, initial charging is performed while gas is released from multiple openings. In the secondary battery precursor of the second embodiment, initial charging is performed while gas is released from one opening. For this reason, as described above, gas generated in the present invention can be easily and quickly discharged from the secondary battery precursor without undergoing much fluid loss.

Figure 7A:
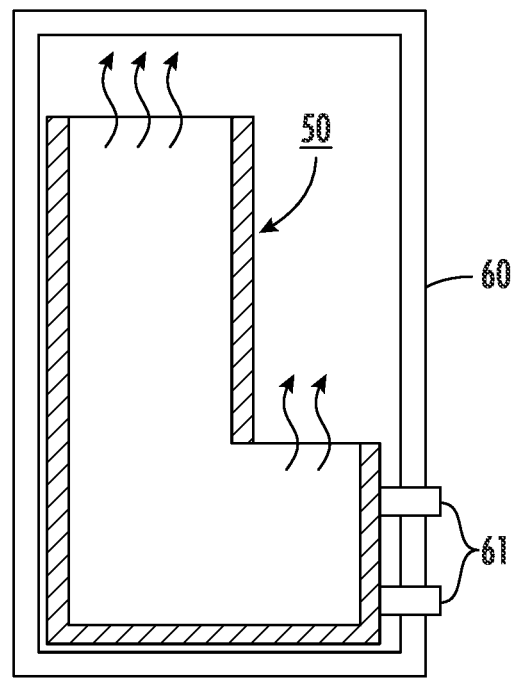
FIG. 7A is a schematic cross-sectional view for describing an initial charging step according to a preferred embodiment.

In the present invention, as shown in FIG. 7A, initial charging is preferably performed by placing the secondary battery precursor 50 in a sealed cassette 60. This is because even if the gas generated in this step is a toxic gas, the initial charging step can be performed safely while the toxic gas is collected in the sealed cassette. Examples of toxic gases include sulfa-based (—S) compound gas and cyan-based (—CN) compound gas. Examples of a secondary battery material capable of generating such a toxic gas include, among a solvent and a solute forming a liquid, gel, or solid electrolyte, a sulfur atom-containing compound, a nitrogen atom-containing compound, and a cyano group-containing compound. Among the solvents and solutes that form the liquid, solid, or gel electrolyte described later, examples include a sulfur atom-containing compound, a nitrogen atom-containing compounds, and a cyano group-containing compound. Note that the present invention is effective even when the electrolyte is solid. This is because even a solid body contains some water at the time of initial charging, and a gas decomposition product containing a decomposition product of water (hydrogen) and a hydrolysate is generated.

As shown in FIG. 7A, the sealed cassette 60 is provided with current terminals 61, and can provide charging equipment from outside the sealed cassette 60 by being electrically connected to the external terminals of the secondary battery precursor 50 inside the sealed cassette 60.

One secondary battery precursor 50 may be disposed in one sealed cassette 60, or two or more secondary battery precursors 50 may be disposed in one sealed cassette 60. By providing two or more secondary battery precursors 50 in one sealed cassette 60 and performing initial charging, the manufacturing efficiency of the secondary battery is improved.

By using the sealed cassette 60, the ambient atmosphere of the secondary battery precursor 50 can be easily reduced. That is, the ambient atmosphere of the secondary battery precursor 50 can be reduced only by reducing the pressure inside the sealed cassette 60. By reducing the ambient atmosphere of the secondary battery precursor 50, the gas generated inside becomes more easily and actively discharged to the outside. As a result, initial charging can be performed while preventing charging unevenness due to air bubbles even more sufficiently in the entire secondary battery precursor.

In the present invention, initial charging is usually preferably performed while the secondary battery precursor is restrained. The restraint for the secondary battery precursor is tightening from the outside due to pressure, in other words, pressurization on the surface of the secondary battery precursor, and therefore in a broad sense, can be referred to as "tightening" or "pressurization."

Figure 7B:
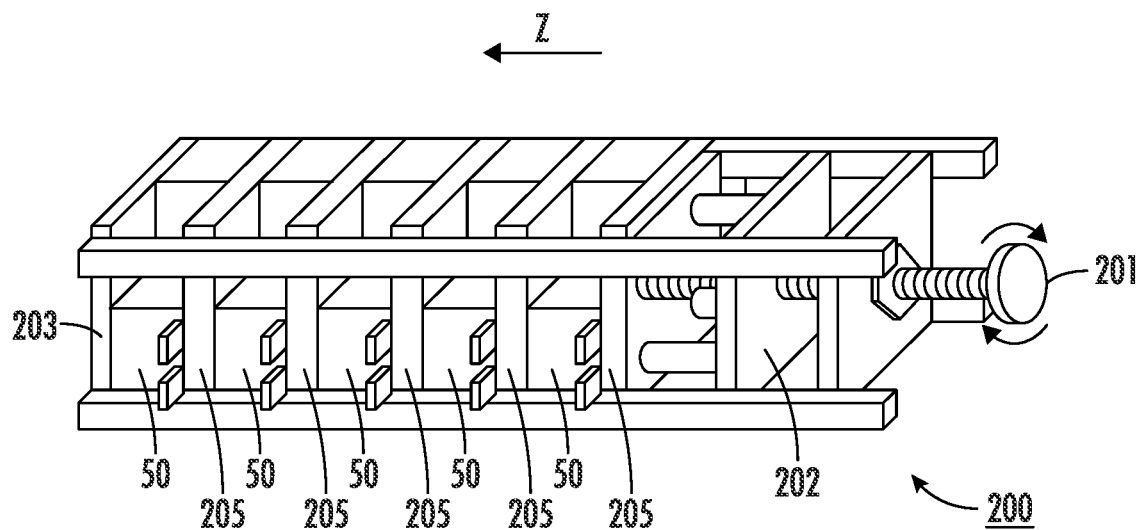
FIG. 7B is a schematic perspective view of a restraining jig for describing an example of a restraining method of a secondary battery precursor.
Figure 8:
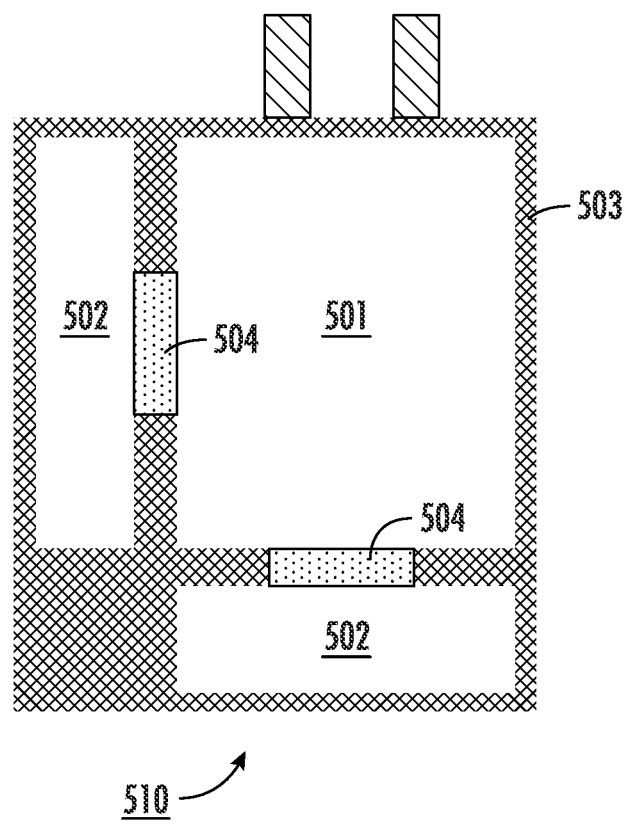
FIG. 8 is a schematic plan view of a secondary battery for describing a secondary battery of a conventional technique.
Figure 9A:
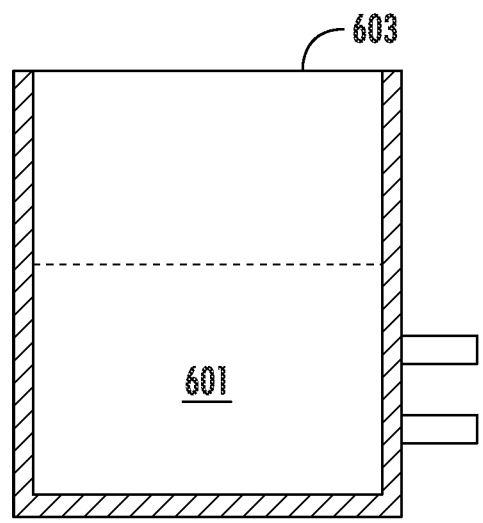
FIG. 9A is a schematic plan view of an outer package including an electrode assembly, showing an example of a step of accommodating the electrode assembly in the outer package in the conventional technique.
Figure 9B:
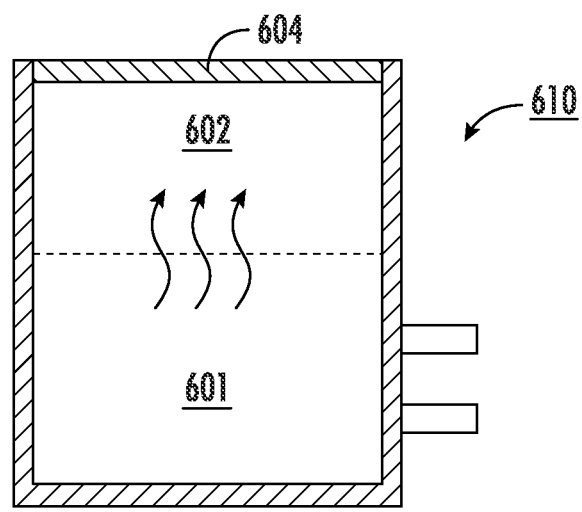
FIG. 9B is a schematic plan view of a secondary battery precursor using the outer package including the electrode assembly of FIG. 9A, for describing an injection step for obtaining the secondary battery precursor and an initial charging step using the secondary battery precursor.
Figure 9C:
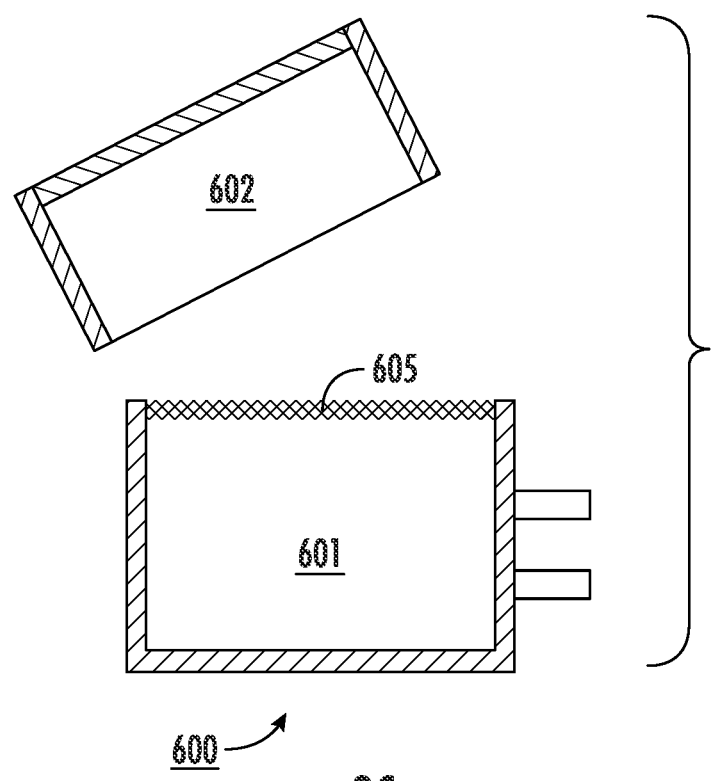
FIG. 9C is a schematic plan view of a secondary battery and a gas pocket, for describing a secondary battery using the secondary battery precursor of FIG. 9B and a removing step for obtaining the secondary battery.
Figure 10A:
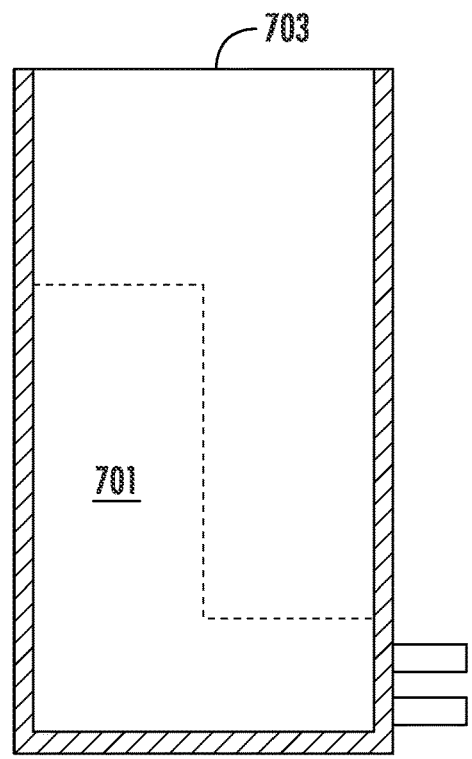
FIG. 10A is a schematic plan view of an outer package including an electrode assembly, showing another example of a step of accommodating the electrode assembly in the outer package in the conventional technique.
Figure 10B:
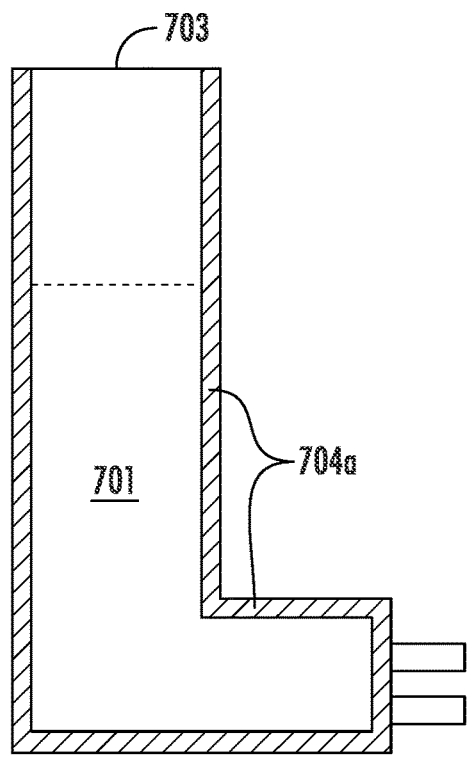
FIG. 10B is a schematic plan view of the outer package including the electrode assembly, showing a step of adapting the outer package to the electrode assembly shape using the outer package including the electrode assembly of FIG. 10A.
Figure 10C:
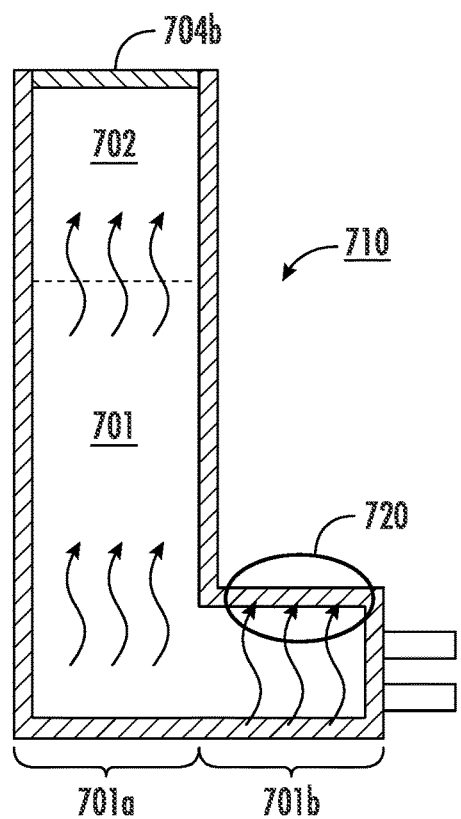
FIG. 10C is a schematic plan view of a secondary battery precursor using the outer package including the electrode assembly of FIG. 10B, for describing an injection step for obtaining the secondary battery precursor and an initial charging step using the secondary battery precursor.
Figure 10D:
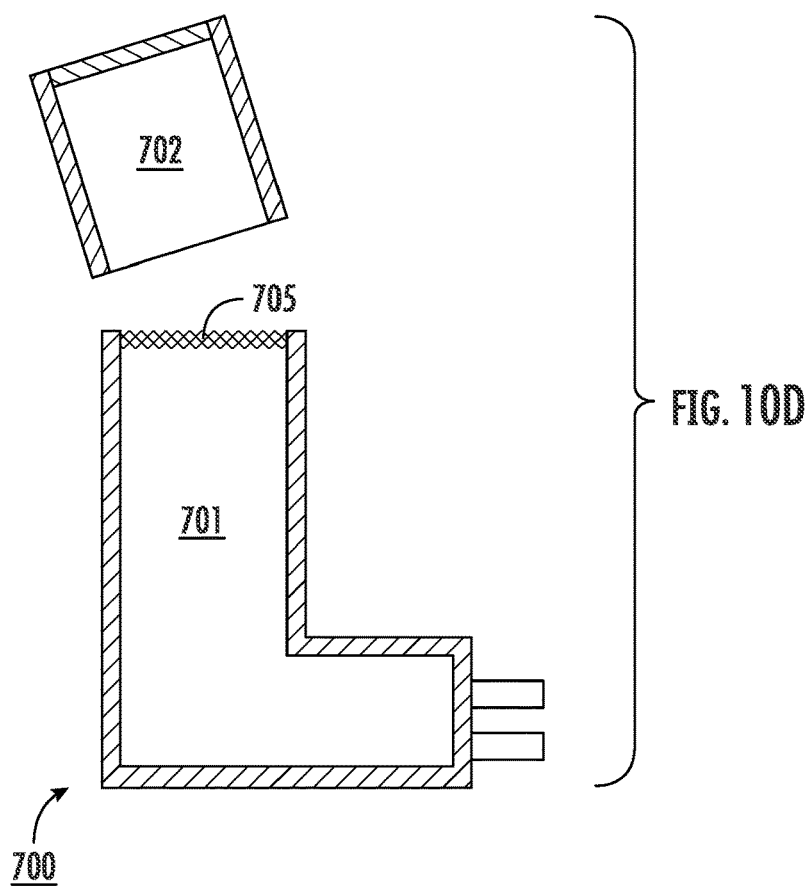
FIG. 10D is a schematic plan view of a secondary battery and a gas pocket, for describing a secondary battery using the secondary battery precursor of FIG. 10C and a removing step for obtaining the secondary battery.

Usually, pressurization in the laminate direction (thickness direction) of the electrode assembly in the secondary battery precursor is achieved by the restraining method of the secondary battery precursor. For example, a restraining jig is used as shown in FIG. 7B. Specifically, as shown in FIG. 7B, initial charging is performed while the secondary battery precursor 50 is restrained by applying a restraining force in an electrode thickness direction Z of the secondary battery precursor 50 by the restraining jig 200. According to such a method, air bubbles are prevented from adhering to the electrode surface of the secondary battery precursor 50 even more reliably, and formation of an SEI coating having a uniform thickness is promoted. The restraining jig 200 applies a restraining force in the direction Z between a movable plate 202 and a fixed plate 203 to the one or more secondary battery precursors 50 with restraining plates 205 interposed therebetween, by rotation of a bolt 201.

The restraint force (i.e., pressure on secondary battery precursor surface) is not particularly limited as long as the gas generated in this step is prevented from adhering to the negative electrode surface, and is usually a pressure higher than atmospheric pressure. Specifically, the restraint force is usually in the range of 0.1 MPa or more and 2 MPa or less from the viewpoint of preventing the gas adhesion to the negative electrode surface even more reliably.

In this step, from the viewpoint of preventing gas adhesion to the negative electrode surface more reliably, the secondary battery precursor is preferably maintained at a temperature in the range of 25° C. or higher and 100° C. or lower, more preferably in the range of 35° C. or higher and 90° C. or lower, and still more preferably 40° C. or higher and 85° C. or lower. Specifically, it is only necessary that the ambient (atmosphere) temperature where the secondary battery precursor is placed in this step be maintained within the above range.

In the present invention, it is only necessary that charging be performed at least once in the initial charging step.

Usually, charging and discharging is performed once or more. One charging and discharging includes one charging and one subsequent discharging. When performing charging and discharging twice or more, the charging and discharging is repeated for the number of times. The initial charging when generated gas is released only needs to be performed at least during the first charging, and is preferably performed during all charging and discharging.

The charging method may be a constant current charging method, a constant voltage charging method, or a combination thereof. For example, constant current voltage and constant voltage charging may be repeated during one charging. The charging conditions are not particularly limited as long as the SEI coating is formed. From the viewpoint of further improving the uniformity of the thickness of the SEI coating, it is preferable to perform constant voltage charging after performing constant current charging. When performing constant voltage charging after performing constant current charging, it is preferable to employ the following charging conditions from the viewpoint of further improving the uniformity of the thickness of the SEI coating. Note that the temperature at the time of charging only needs to be in a range similar to the temperature of the secondary battery precursor described above.

Constant Current Charging Method:

Constant current charging is performed at a constant current value of 0.01 CA or higher and 3 CA or lower, particularly 0.05 CA or higher and 2 CA or lower, until the voltage value reaches 1 V or higher and 6 V or lower, particularly 3 V or higher and 5 V or lower. Here, 1 CA is a current value when the rated capacity of the secondary battery is discharged in one hour.

Constant Voltage Charging Method:

Constant voltage charging is performed by the voltage value achieved by constant current charging until the value reaches a predetermined value smaller than the constant current value during constant current charging, or until a predetermined time elapses.

The discharging method may usually be a constant current discharge method, a constant voltage discharge method, or a combination thereof. The discharging conditions are not particularly limited as long as the SEI coating is formed. From the viewpoint of further improving the uniformity of the thickness of the SEI coating, it is preferable to perform constant current discharging. When performing constant current discharging, it is preferable to employ the following discharging conditions from the viewpoint of further improving the uniformity of the SEI coating thickness. Note that the temperature at the time of discharging may be in a range similar to the temperature of the secondary battery precursor described above, or may be a temperature lower than that at the time of charging.

Constant Current Discharging Method:

Constant current discharging is performed at a constant current value of 0.1 CA or higher and 3 CA or lower, particularly 0.2 CA or higher and 2 CA or lower, until the voltage value reaches 1 V or higher and 4 V or lower, particularly 2 V or higher and 3.5 V or lower.

The charging and discharging may be performed by using the two external terminals 5.

(Sealing Step)

After the initial charging step, a sealing step is performed. The sealing step differs between the secondary battery precursor of the first embodiment and the secondary battery precursor of the second embodiment.

(1) First Embodiment

After the secondary battery precursor 50 according to the first embodiment is subjected to the initial charging step, a sealing step for sealing the opening 6 is performed as shown in FIGS. 1B to 3B. The sealing method in the sealing step of the embodiment may be similar to the sealing method in the accommodating step. Since the opening 6 has undergone the initial charging step, and the electrolyte adheres to the inner surfaces of the two sheets forming the outer package 3 in the opening 6, the seal portion formed by the seal of the opening 6 contains an electrolyte component. Such a seal portion containing the electrolyte component and formed in the opening 6 is referred to as a "second seal portion", and is denoted by reference symbol "1*b*" in the drawings.

In the embodiment, the opening 6 is preferably sealed while maintaining the inside of the outer package in a reduced pressure state to form the second seal portion 1*b*. This is because air is further removed from the inside of the outer package. The pressure inside the outer package at the time of sealing is usually in the range of "atmospheric pressure −90 kPa" or more and "atmospheric pressure −1 kPa" or less, and equal to or below the vapor pressure curve of the electrolyte so that the electrolyte does not boil.

(2) Second Embodiment

After the secondary battery precursor 50 according to the second embodiment is subjected to the initial charging step, as shown in FIGS. 4B to 6B, a sealing step is performed in which the opening 6 is sealed, a boundary between the cutout corresponding part 10a and the electrode assembly 1 in the secondary battery precursor 50 in plan view is sealed, and the cutout corresponding part 10a in the secondary battery precursor is removed. The sealing method in the sealing step of this embodiment, too, may be similar to the sealing method in the accommodating step.

In this embodiment, too, since the opening 6 has undergone the initial charging step, and the electrolyte adheres to the inner surfaces of the two sheets forming the outer package 3 in the opening 6, the seal portion formed by the seal of the opening 6 is the second seal portion 1b containing an electrolyte component.

In this embodiment, too, the opening 6 is preferably sealed while maintaining the inside of the outer package in a reduced pressure state to form the second seal portion 1b, by a similar method as when using the secondary battery precursor of the first embodiment.

In the embodiment, the boundary between the cutout corresponding part 10a and the electrode assembly 1 and the vicinity thereof sealed separately from the opening 6 usually contain the electrolyte of the two sheets forming the outer package 3 and between the two sheets. For this reason, the seal portion formed by the boundary seal contains an electrolyte component. Such a seal portion containing the electrolyte component and formed at the boundary between the cutout corresponding part 10a and the electrode assembly 1 is referred to as a "third seal portion", and is denoted by reference symbol "1c" in the drawings.

The sealing method in the sealing step of this embodiment, too, may be similar to the sealing method in the accommodating step. In the embodiment, in this step, it is preferable to seal the boundary between the cutout corresponding part 10a and the electrode assembly 1, seal the opening 6, and finally remove the cutout corresponding part 10a.

After sealing is performed in this step of the embodiment, usually, the cutout corresponding part 10a of the secondary battery precursor 50 is removed to obtain the secondary battery 100. The removing method is not particularly limited as long as the electrolyte does not leak from the obtained secondary battery 100, and examples thereof include a method of cutting with a cutter or the like.

In the embodiment, in this step, it is preferable to seal the boundary between the cutout corresponding part 10a and the electrode assembly 1, seal the opening 6, and finally remove the cutout corresponding part 10a.

(Aging Step)

An aging step may be performed. The aging step may be performed after the sealing step. Preferably, after performing the initial charging step, the sealing step and the aging step are performed in this order. The aging step is a step of stabilizing the SEI coating by leaving the secondary battery after the initial charging step in an open circuit state. The aging step is also referred to as an aging step.

In the aging step, the temperature of the secondary battery is not particularly limited, and may be maintained in a range of 15° C. or higher and 80° C. or lower, for example. The secondary battery is preferably maintained at a temperature in the range of 20° C. or higher and 70° C. or lower, and more preferably 25° C. or higher and 60° C. or lower from the viewpoint of further stabilization of the SEI coating. Specifically, the temperature can be maintained within the above range by leaving the secondary battery in a space set at a constant temperature.

The standing time in the aging step is not particularly limited as long as the stabilization of the SEI coating is promoted, and is usually 0.5 hours or more and 30 days or less, and from the viewpoint of further stabilization of the SEI coating, is preferably in the range of 1 hour or more and 14 days or less, and more preferably in the range of 2 hours or more and 7 days or less. Further, the aging step does not necessarily have to be performed at once, but may be divided into two times or more.

In the secondary battery 100, as described above, the second seal portion 1b and the third seal portion 1c contain an electrolyte component, and the first seal portion 1a does not contain an electrolyte component. "The second seal portion 1b and the third seal portion 1c contain an electrolyte component" means that the electrolyte component is contained and sandwiched between the two outer package sheets forming the second seal portion 1b and the third seal portion 1c. In the second seal portion 1b and the third seal portion 1c an electrolyte component is contained in a molten component (adhesive component) (flexible pouch) or a molten (metal) component (hard case) for sealing (adhesion) between the two outer package sheets, for example. "The first seal portion 1a does not contain an electrolyte component" means that no electrolyte component is contained between the two outer package sheets forming the first seal portion 1a. However, this does not mean that the electrolyte component is strictly not contained, but that there is hardly any electrolyte component contained as compared with the second seal portion 1b and the third seal portion 1c.

The content of the electrolyte component can be confirmed by subjecting the molten component of the seal portion to elemental analysis. For example, a ratio R of the total amount (total number) of atoms (e.g., Li atoms, F atoms, P atoms, and B atoms) derived from the electrolyte component to the amount (number) of all atoms in the fusion component (adhesion component) is obtained. For example, the ratio R in the first seal portion 1a is usually one fifth or less, particularly one tenth or less, of the ratio R in the second seal portion 1b and the third seal portion 1c.

[Component and Material of Secondary Battery]

The positive electrode is formed of at least a positive electrode material layer and a positive electrode current collector (foil), and it is sufficient that the positive electrode material layer is provided on at least one surface of the positive electrode current collector. For example, in the positive electrode, a positive electrode material layer may be provided on both surfaces of the positive electrode current collector, or a positive electrode material layer may be provided on one surface of the positive electrode current collector. A positive electrode preferable from the viewpoint of further increasing the capacity of the secondary battery is provided with a positive electrode material layer on both surfaces of the positive electrode current collector. The positive electrode material layer contains a positive electrode active material.

The negative electrode is formed of at least a negative electrode material layer and a negative electrode current collector (foil), and it is sufficient that the negative electrode material layer is provided on at least one surface of the negative electrode current collector. For example, in the negative electrode, the negative electrode material layer may be provided on both surfaces of the negative electrode current collector, or the negative electrode material layer may be provided on one surface of the negative electrode current collector. A negative electrode preferable from the viewpoint of further increasing the capacity of the secondary battery is provided with a negative electrode material layer on both surfaces of the negative electrode current collector. The negative electrode material layer contains a negative electrode active material.

The positive electrode active material contained in the positive electrode material layer and the negative electrode active material contained in the negative electrode material layer are materials directly involved in the transfer of electrons in the secondary battery, and are the main materials of the positive and negative electrodes that are indispensable for charging and discharging, that is, for the battery reaction. More specifically, ions are brought into the electrolyte due to the "positive electrode active material contained in the positive electrode material layer" and the "negative electrode active material contained in the negative electrode material layer", and the ions move between the positive electrode and the negative electrode to transfer the electrons, whereby charging and discharging is performed. As will be described later, it is preferable that the positive electrode material layer and the negative electrode material layer be layers capable of occluding and releasing lithium ions in particular. That is, a secondary battery in which lithium ions move between the positive electrode and the negative electrode through the electrolyte for charging and discharging of the battery is preferable. When lithium ions are involved in charging and discharging, the secondary battery according to the present invention corresponds to a so-called "lithium ion battery."

The positive electrode active material of the positive electrode material layer is made of a granular material, for example, and it is preferable that a binder is contained in the positive electrode material layer in order for sufficient contact among the particles and maintenance of the shape. Furthermore, it is also preferable that a conductive additive is contained in the positive electrode material layer in order to facilitate the transmission of electrons that promote the battery reaction. Similarly, the negative electrode active material of the negative electrode material layer is made of a granular material, for example, and it is preferable that a binder is contained for sufficient contact among the particles and maintenance of the shape, and a conductive additive may be contained in order to facilitate the transmission of electrons that promote the battery reaction. Thus, since the form contains multiple component, the positive electrode material layer and the negative electrode material layer can also be referred to as a "positive electrode mixture layer" and a "negative electrode mixture layer", respectively.

The positive electrode active material is preferably a material that contributes to occlusion and release of lithium ions. From this point of view, the positive electrode active material is preferably, a lithium-containing composite oxide, for example. More specifically, the positive electrode active material is preferably a lithium transition metal composite oxide containing lithium and at least one transition metal selected from the group consisting of cobalt, nickel, manganese, and iron. That is, in the positive electrode material layer of the secondary battery according to the present invention, such a lithium transition metal composite oxide is preferably contained as a positive electrode active material. For example, the positive electrode active material may be lithium cobaltate, lithium nickelate, lithium manganate, lithium iron phosphate, or a part of those transition metals replaced with another metal. While such a positive electrode active material may be contained as a single species, two or more types may be contained in combination. In a more preferred embodiment, the positive electrode active material contained in the positive electrode material layer is lithium cobalt oxide.

The binder that can be contained in the positive electrode material layer is not particularly limited, but may be made of at least one selected from the group consisting from polyvinylidene fluoride, vinylidene fluoride-hexafluoropropylene copolymer, vinylidene fluoride-tetrafluoroethylene copolymer, polytetrafluoroethylene, and the like. The conductive additive that can be contained in the positive electrode material layer is not particularly limited, but examples thereof include at least one selected from carbon black such as thermal black, furnace black, channel black, ketjen black, and acetylene black, graphite, carbon fibers such as carbon nanotube and vapor phase growth carbon fibers, metal powders such as copper, nickel, aluminum and silver, and polyphenylene derivatives. In a more preferred embodiment, the binder of the positive electrode material layer is polyvinylidene fluoride, and in another more preferred embodiment, the conductive additive of the positive electrode material layer is carbon black. In a more preferred embodiment, the binder and conductive additive of the positive electrode material layer are a combination of polyvinylidene fluoride and carbon black.

The negative electrode active material is preferably a material that contributes to occlusion and release of lithium ions. From this point of view, the negative electrode active material is preferably various carbon materials, oxides, or lithium alloys, for example.

Examples of various carbon materials of the negative electrode active material include graphite (natural graphite, artificial graphite), hard carbon, soft carbon, diamond-like carbon, and the like. In particular, graphite is preferable in that it has high electron conductivity and excellent adhesion to the negative electrode current collector. Examples of the oxide of the negative electrode active material include at least one selected from the group consisting of silicon oxide, tin oxide, indium oxide, zinc oxide, lithium oxide, and the like. The lithium alloy of the negative electrode active material may be any metal that can be alloyed with lithium, and may be a binary, ternary or higher alloy of a metal such as Al, Si, Pb, Sn, In, Bi, Ag, Ba, Ca, Hg, Pd, Pt, Te, Zn, La and lithium, for example.

Such an oxide is preferably amorphous in its structural form. This is because deterioration due to non-uniformity such as crystal grain boundaries or defects is less likely to occur. In a more preferred embodiment, the negative electrode active material of the negative electrode material layer is artificial graphite.

The binder that can be contained in the negative electrode material layer is not particularly limited, but may be at least one selected from the group consisting of styrene butadiene rubber, polyacrylic acid, polyvinylidene fluoride, polyimide resin, and polyamideimide resin. In a more preferred embodiment, the binder contained in the negative electrode material layer is styrene butadiene rubber. The conductive additive that can be contained in the negative electrode material layer is not particularly limited, but examples thereof include at least one selected from carbon black such as thermal black, furnace black, channel black, ketjen black, and acetylene black, graphite, carbon fibers such as carbon nanotube and vapor phase growth carbon fibers, metal powders such as copper, nickel, aluminum and silver, and polyphenylene derivatives. Note that the negative electrode material layer may contain a component derived from a thickener component (e.g., carboxymethyl cellulose) used during battery production.

In a more preferred embodiment, the negative electrode active material and the binder in the negative electrode material layer are a combination of artificial graphite and styrene butadiene rubber.

The present invention is effective when the positive electrode and/or the negative electrode contain a relatively large amount of volatile components such as moisture. In the present invention, as described above, the gas (volatile matter) generated in the secondary battery precursor in the initial charging step can be easily and quickly discharged. An example is a case of an electrode using an aqueous binder. Further, when a nanomaterial having an active material primary particle size of 100 nm or less is used, the surface area of the particles increases and the amount of moisture adsorption increases. Specific active materials include $LiMPO_4$ (M=Fe, Mn, Co, and the like) that has an olivine structure in the positive electrode material, and hard carbon, soft carbon, and spinel lithium titanium oxide ($Li_4Ti_5O_{12}$) that are amorphous carbon in the negative electrode material.

The positive electrode current collector and the negative electrode current collector used for the positive electrode and the negative electrode are members that contribute to collecting and supplying electrons generated in the active material due to the battery reaction. Such a current collector may be a sheet-like metal member and may have a porous or perforated form. For example, the current collector may be a metal foil, a punching metal, a net or an expanded metal. The positive electrode current collector used for the positive electrode is preferably made of a metal foil containing at least one selected from the group consisting of aluminum, stainless steel, nickel and the like, and may be an aluminum foil, for example. On the other hand, the negative electrode current collector used for the negative electrode is preferably made of a metal foil containing at least one selected from the group consisting of copper, stainless steel, nickel and the like, and may be a copper foil, for example.

The separator is a member provided from the viewpoints of preventing short circuit due to contact between the positive and negative electrodes and retention of the electrolyte. In other words, the separator can regarded as a member that allows ions to pass while preventing electronic contact between the positive electrode and the negative electrode. Preferably, the separator is a porous or microporous insulating member and is in the form of a film due to its small thickness. Although only illustrative, a polyolefin microporous film may be used as the separator. In this regard, the microporous membrane used as the separator may contain only polyethylene (PE) or only polypropylene (PP) as the polyolefin, for example. Furthermore, the separator may be a laminate formed of a "PE microporous membrane" and a "PP microporous membrane." The surface of the separator may be covered with an inorganic particle coat layer and/or an adhesive layer or the like. The surface of the separator may have adhesiveness.

The electrolyte assists the movement of metal ions released from the electrodes (positive electrode and negative electrode). The electrolyte may be a "non-aqueous" electrolyte, such as an organic electrolyte and an organic solvent, or may be an "aqueous" electrolyte containing water. The secondary battery of the present invention is preferably a non-aqueous electrolyte secondary battery in which an electrolyte containing a "non-aqueous" solvent and a solute is used as the electrolyte. The electrolyte may have a liquid form, a solid form, a gel form, or the like (Note that in this specification, a "liquid" non-aqueous electrolyte is also referred to as "non-aqueous electrolyte solution").

As a specific non-aqueous electrolyte solvent, a solvent containing at least carbonate is preferable. Such carbonates may be cyclic carbonates and/or chain carbonates. Although not particularly limited, examples of the cyclic carbonates include at least one selected from the group consisting of propylene carbonate (PC), ethylene carbonate (EC), butylene carbonate (BC), and vinylene carbonate (VC). Examples of the chain carbonates include at least one selected from the group consisting of dimethyl carbonate (DMC), diethyl carbonate (DEC), ethyl methyl carbonate (EMC), and dipropyl carbonate (DPC). In one preferred embodiment of the present invention, a combination of cyclic carbonates and chain carbonates is used as the non-aqueous electrolyte, and a mixture of ethylene carbonate and diethyl carbonate is used, for example. Non-aqueous electrolyte solvents may also include carboxylic acid esters such as methyl propionate (MP), ethyl propionate (EP), propyl propionate (PP), and the like.

As specific non-aqueous electrolyte solutes, for example, Li salts such as $LiPF_6$ and $LiBF_4$ are preferably used.

The electrolyte (particularly non-aqueous electrolyte) contains additives such as vinylene carbonate, 1,3-propane sultone, and fluorinated ethylene carbonate. By including these additives in the electrolyte (particularly non-aqueous electrolyte), an SEI coating is formed during initial charging.

The present invention is effective when the solvent of the electrolyte is easily volatilized. In the present invention, as described above, the gas (volatile matter) generated in the secondary battery precursor in the initial charging step can be easily and quickly discharged. As an example, a low boiling point solvent having a vapor pressure of 1 mmHg or more at around room temperature of 25° C. may be used. Specific examples include chain carbonates dimethyl carbonate (DMC), diethyl carbonate (DEC), ethyl methyl carbonate (EMC), carboxylic acid esters methyl propionate (MP), ethyl propionate (EP), and propyl propionate (PP).

Any current collecting lead used in the field of secondary batteries can be used as the current collecting lead. Such a current collecting lead may be made of a material capable of achieving electron movement, and is usually made of a conductive material such as aluminum, nickel, iron, copper, and stainless steel. The form of the current collecting lead is not particularly limited, and may be a linear shape or a plate shape, for example.

As the external terminal 5, any external terminal used in the field of secondary batteries can be used. Such an external terminal may be made of a material capable of achieving electron movement, and is usually made of a conductive material such as aluminum, nickel, iron, copper, and stainless steel. The form of the external terminal 5 is not particularly limited, and is usually a plate shape. The external terminal 5 may be electrically and directly connected to the substrate, or may be electrically and indirectly connected to the substrate with another device interposed therebetween. The current collecting lead can also be used as an external terminal.

The outer package is preferably a flexible pouch (soft bag), but may be a hard case (hard housing). When the outer package is a flexible pouch, the flexible pouch is usually formed from a film laminate, and is sealed by heat-sealing the peripheral edge. As the film laminate, a film obtained by laminating a metal foil and a polymer film is generally used, and specifically, a three-layered film laminate formed of an outer layer polymer film, a metal foil, and an inner layer polymer film is one example. The outer layer polymer film is for preventing damage to the metal foil due to permeation and contact of moisture and the like, and polymers such as polyamide and polyester can be suitably used. The metal foil is for preventing the permeation of moisture and gas, and a foil of copper, aluminum, stainless steel, or the like can be suitably used. The inner layer polymer film is for protecting the metal foil from the electrolyte accommodated therein, and for melting and sealing at the time of heat sealing, and polyolefin or acid-modified polyolefin can be suitably used. The thickness of the film laminate is not particularly limited, and is preferably 1 μm or more and 1 mm or less, for example.

When the outer package is a hard case, the hard case is usually formed from a metal plate, and is sealed by irradiating the peripheral edge with a laser. As the metal plate, a metal material made of aluminum, nickel, iron, copper, stainless steel or the like is generally used. The thickness of the metal plate is not particularly limited, and is preferably 1 μm or more and 1 mm or less, for example.

The secondary battery manufactured by the method of the present invention can be used in various fields where power storage is assumed. Although only illustrative, a secondary battery manufactured by the method of the present invention, particularly a non-aqueous electrolyte secondary battery, can be used in the electrical, information, and communication field where mobile devices are used (e.g., mobile device field such as mobile phone, smartphone, notebook computer, digital camera, activity meter, arm computer and electronic paper), home and small industrial applications (e.g., power tool, golf cart, home, nursing, and industrial robot field), large industries applications (e.g., forklift, elevator, bay harbor crane field), transportation systems field (e.g., fields such as hybrid vehicle, electric vehicle, bus, train, electric assist bicycle, and electric motorcycle), power system applications (e.g., fields such as various power generation, load conditioner, smart grid, and general home storage system), IoT field, and space and deep sea applications (e.g., fields such as space exploration vehicle and submarine research ship).

DESCRIPTION OF REFERENCE SYMBOLS

1: electrode assembly
1a: first seal portion not containing electrolyte component
1b: second seal portion containing electrolyte component
1c: third seal portion containing electrolyte component
3: outer package
5: external terminal
10: cutout portion in electrode assembly or secondary battery
10a: part corresponding to cutout portion of electrode assembly in outer package or secondary battery precursor (cutout corresponding part)
40: structure obtained in accommodating step (outer package including electrode assembly)
50: secondary battery precursor
100: secondary battery

The invention claimed is:

1. A method of manufacturing a secondary battery, the method comprising:
provinding a secondary battery precursor having an electrode assembly with a cutout portion in a plan view thereof and an electrolyte accommodated in an outer package, the electrode assembly including a positive electrode, a negative electrode, and a separator disposed between the positive electrode and the negative electrode, wherein the secondary battery precursor includes two or more constituent parts having different heights in an erected state, the outer package has a shape corresponding to a shape of the electrode assembly in the plan view thereof, and the outer package has a plurality of openings where an opening of each of the plurality of openings is positioned so as to correspond to a respective one of the two or more constituent parts of the secondary battery precursor having the different heights in the erected state;
erecting the secondary battery precursor so as to have each of the respective one of the plurality of openings of the outer package arranged only uppermost in a vertical direction in the erected state for each of the two or more constituent parts of the secondary battery precursor having the different heights in the erected state; and
initially charging the secondary battery precursor at the same time the outer package has the plurality of openings arranged only uppermost in the vertical direction in the erected state such that gas generated in the secondary battery precursor is released from the plurality of openings of the outer package while the initial charging is performed.

2. The method of manufacturing a secondary battery according to claim 1, further comprising sealing the plurality of openings after the initial charging.

3. The method of manufacturing a secondary battery according to claim 1, wherein the electrolyte is a liquid.

4. The method of manufacturing a secondary battery according to claim 1, wherein the outer package is a flexible pouch.

5. The method of manufacturing a secondary battery according to claim 1, wherein the secondary battery is configured as a secondary battery for a mobile device.

6. The method of manufacturing a secondary battery according to claim 1, wherein the positive electrode and the negative electrode each have a layer capable of occluding and releasing lithium ions.

7. The method of manufacturing a secondary battery according to claim 1, wherein the electrode assembly has a flat laminated structure in which a plurality of electrode units including the positive electrode, the negative electrode, and the separator are laminated together in a flat shape.

8. The method of manufacturing a secondary battery according to claim 1, further comprising disposing one or more of the secondary battery precursors in a sealed cassette and performing the initial charging.

9. The method of manufacturing a secondary battery according to claim 8, further comprising reducing a pressure inside the sealed cassette.

10. The method of manufacturing a secondary battery according to claim 1, further comprising:
accommodating the electrode assembly in the outer package, and sealing an outer edge region of the outer package except for the plurality of openings; and
injecting the electrolyte through at least one of the plurality of openings into the outer package containing the electrode assembly.

* * * * *